Nov. 10, 1970  A. J. CARPENTER ET AL  3,538,584

THREADING AND ASSEMBLING APPARATUS

Filed Feb. 26, 1968  18 Sheets-Sheet 1

INVENTORS
ALBERT JAMES CARPENTER
GEORGE ROBERT METZDORF
BURNELL CALVIN STAMBAUGH

BY Jay L. Seitchik

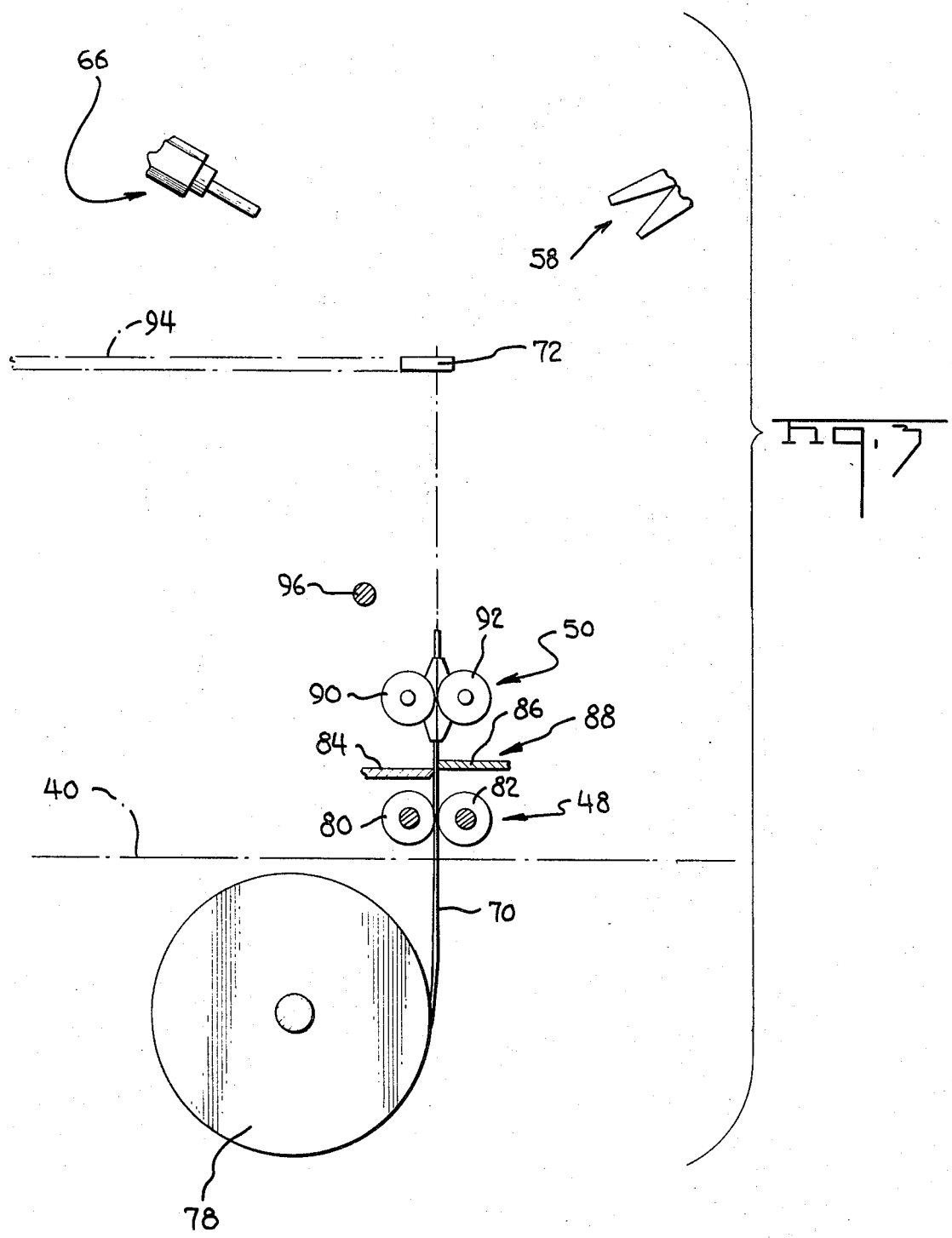

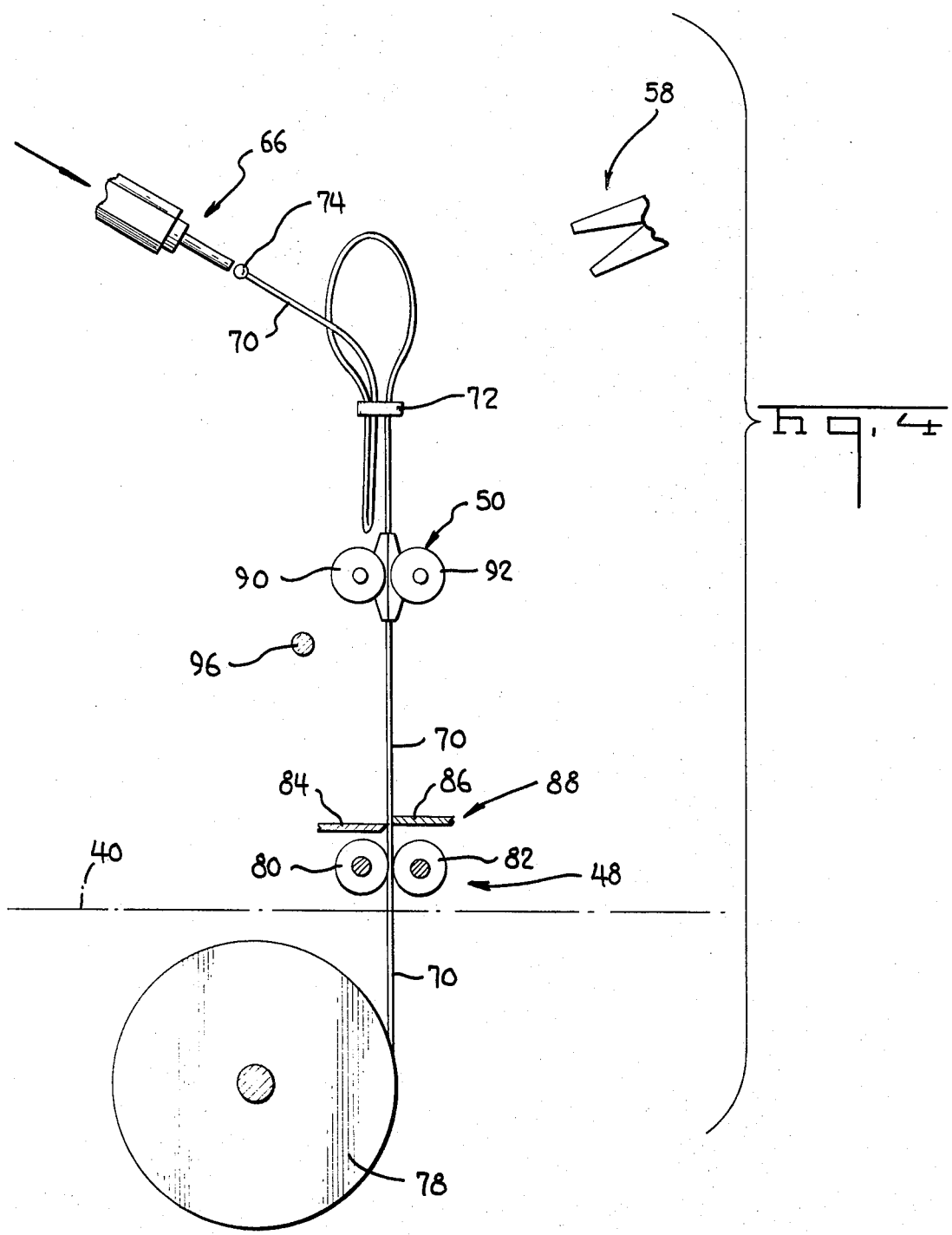

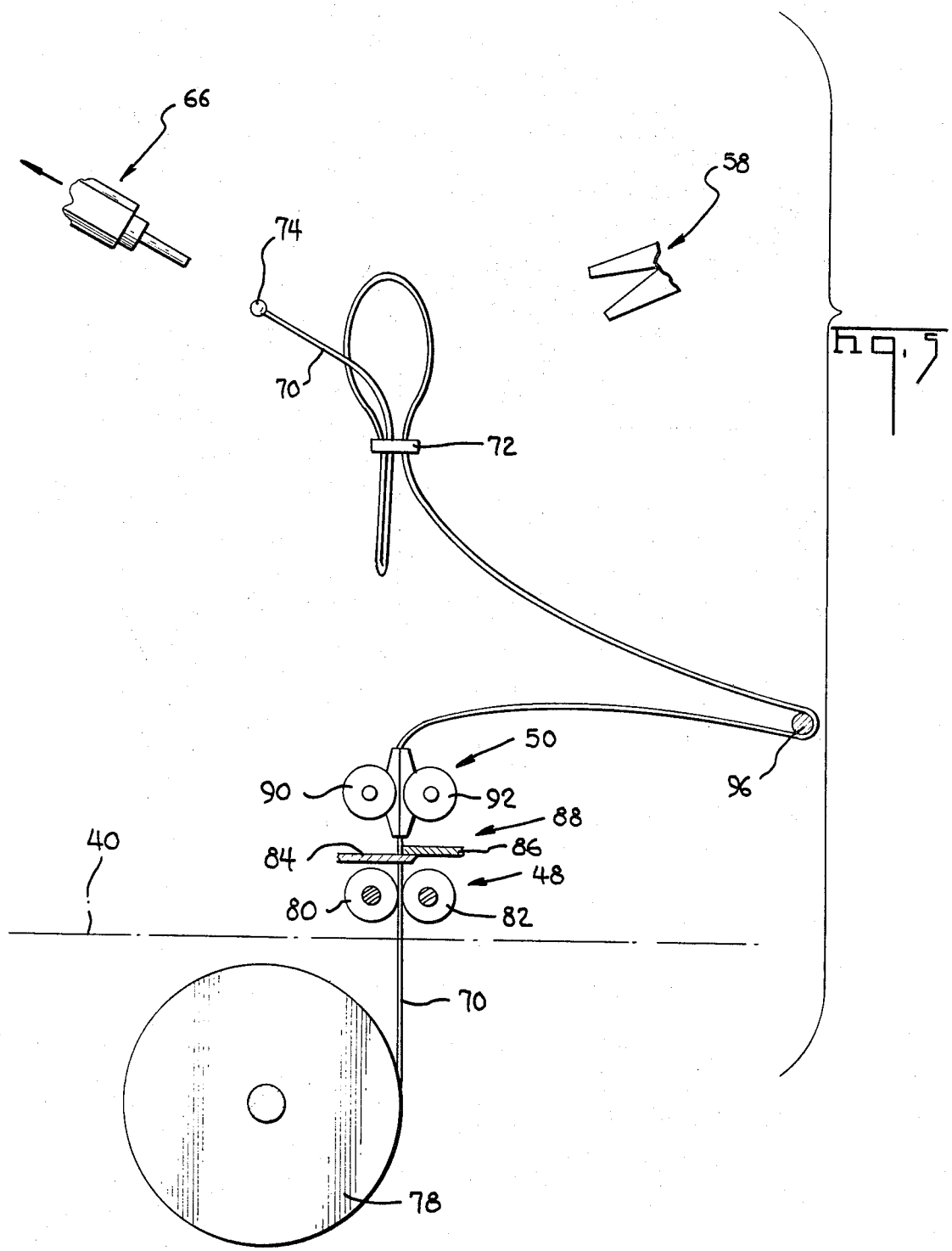

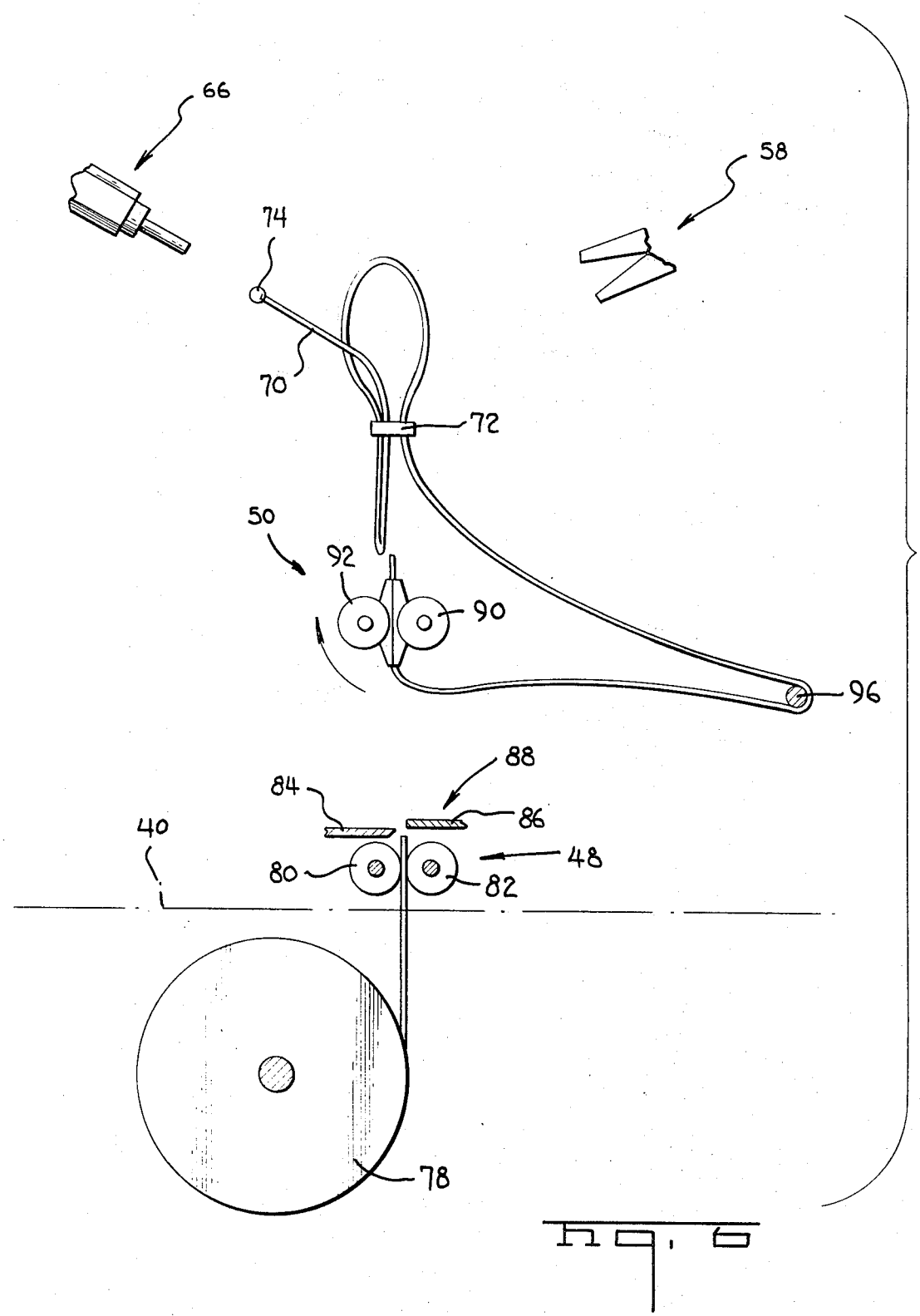

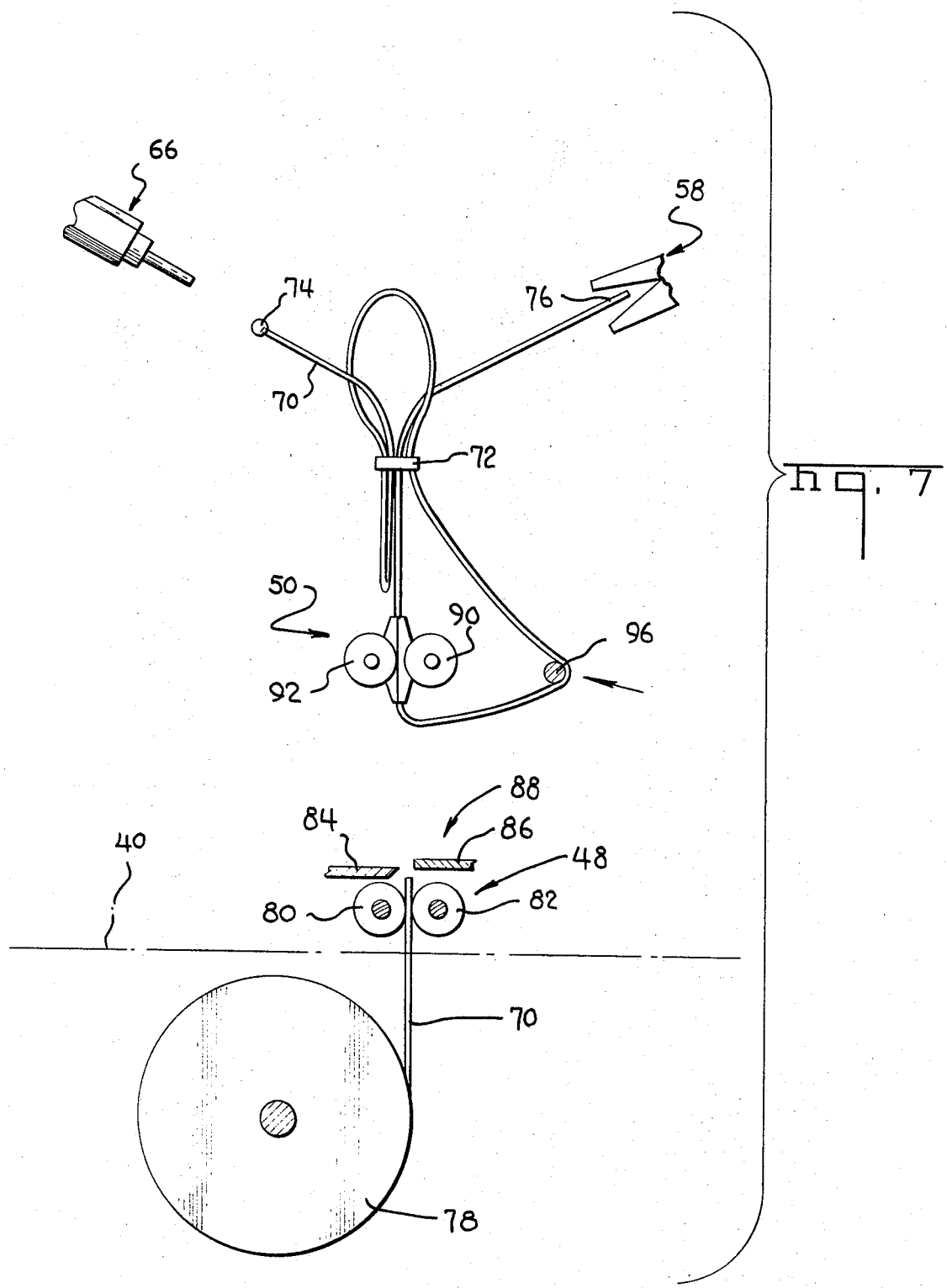

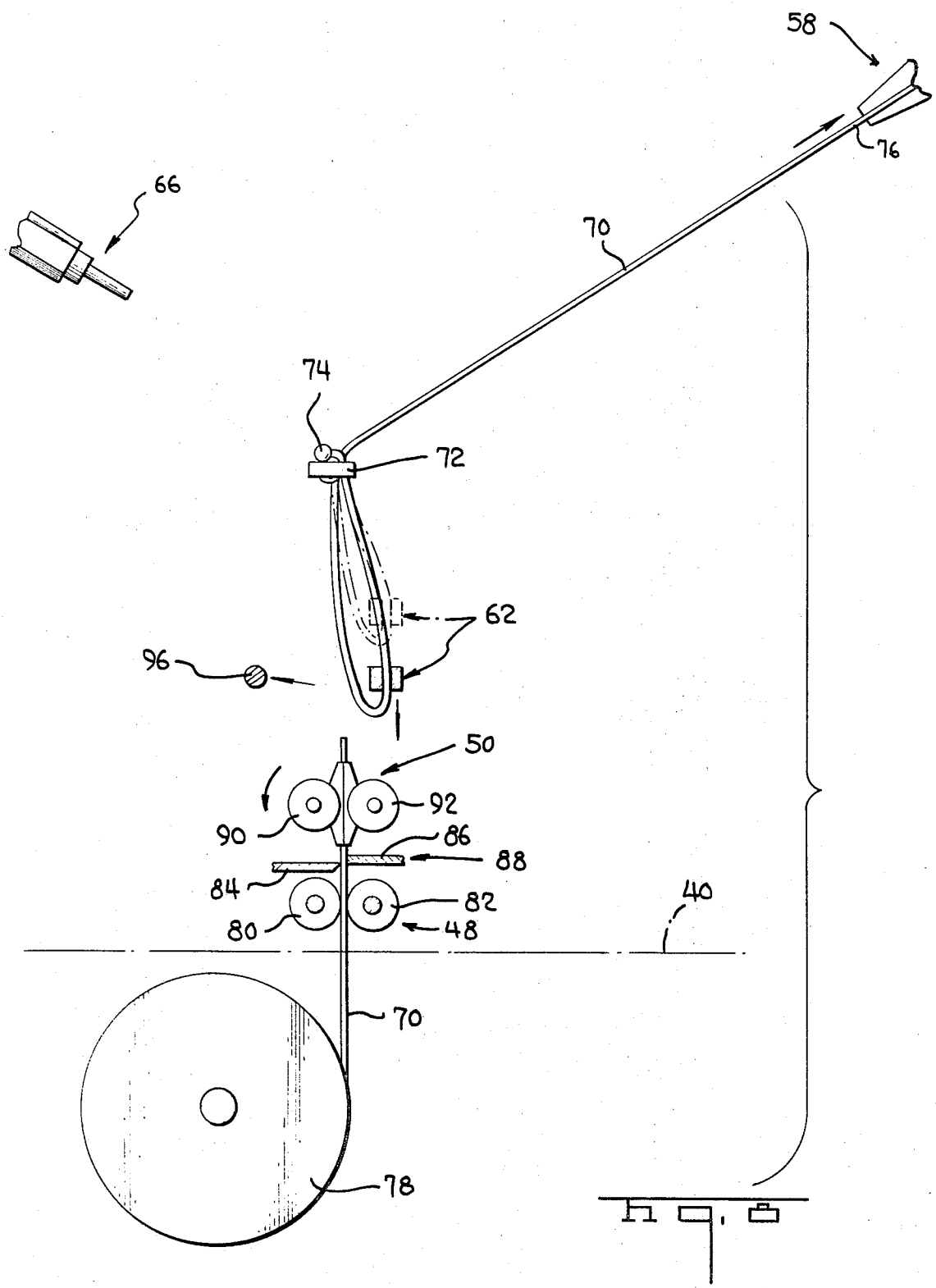

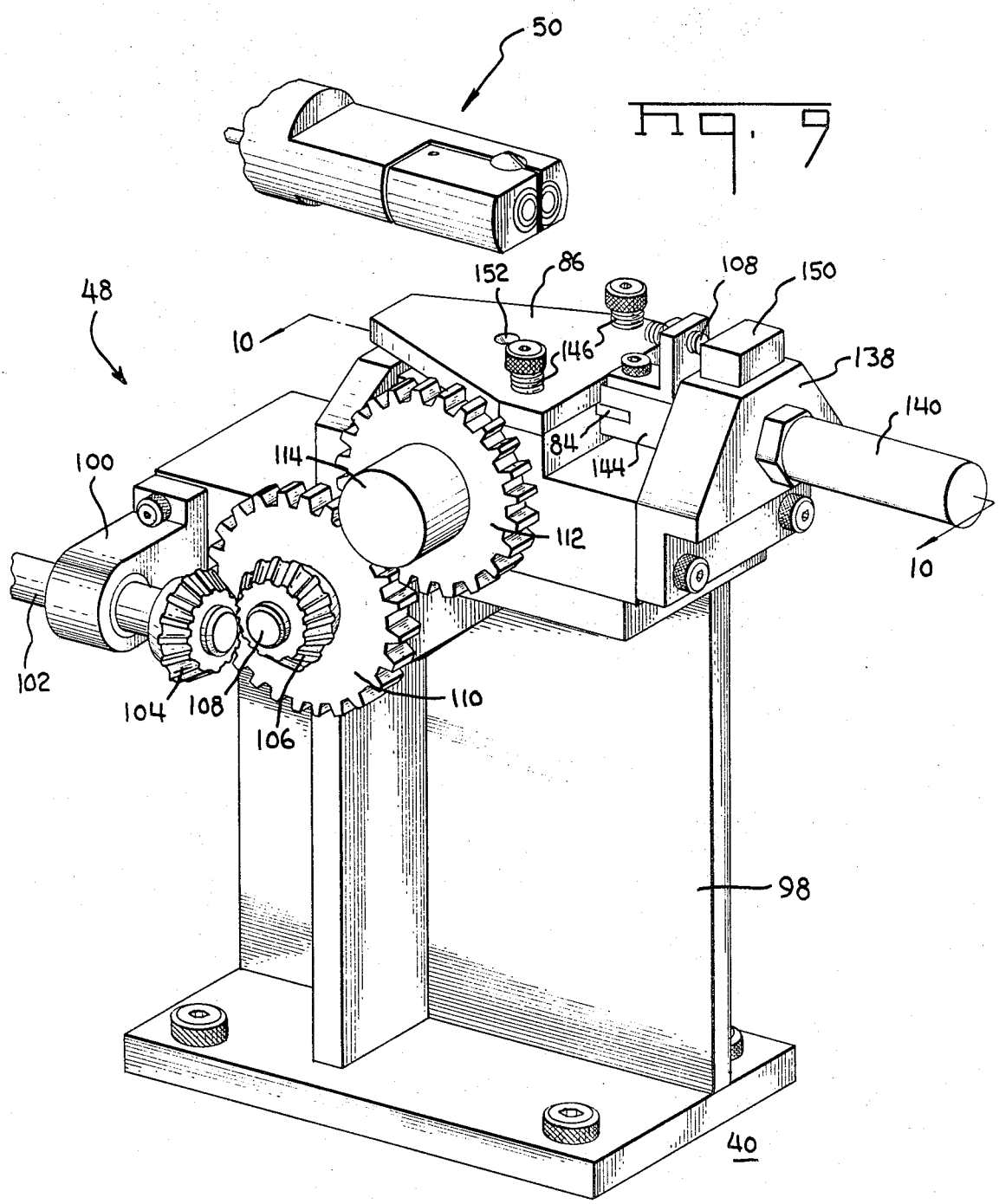

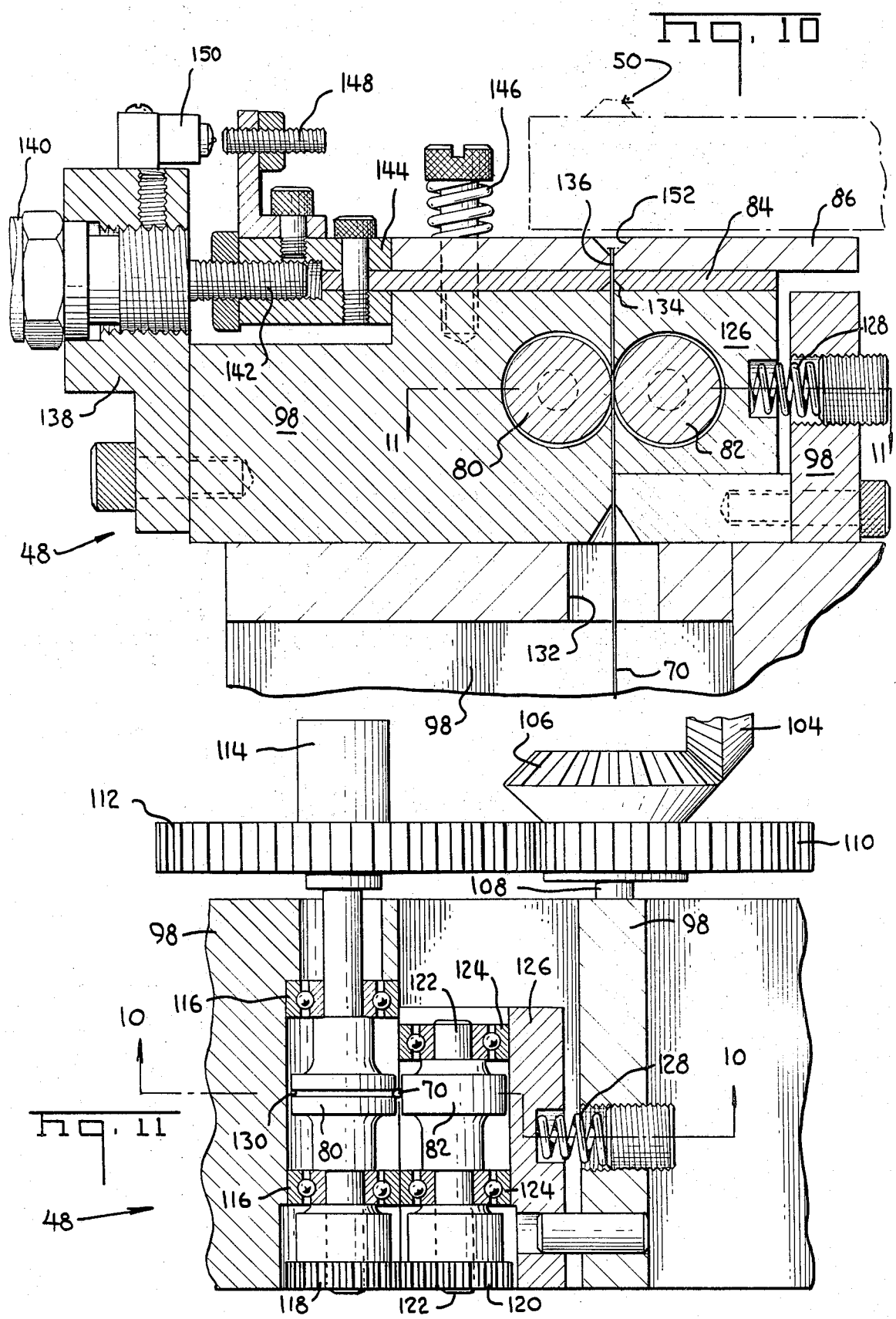

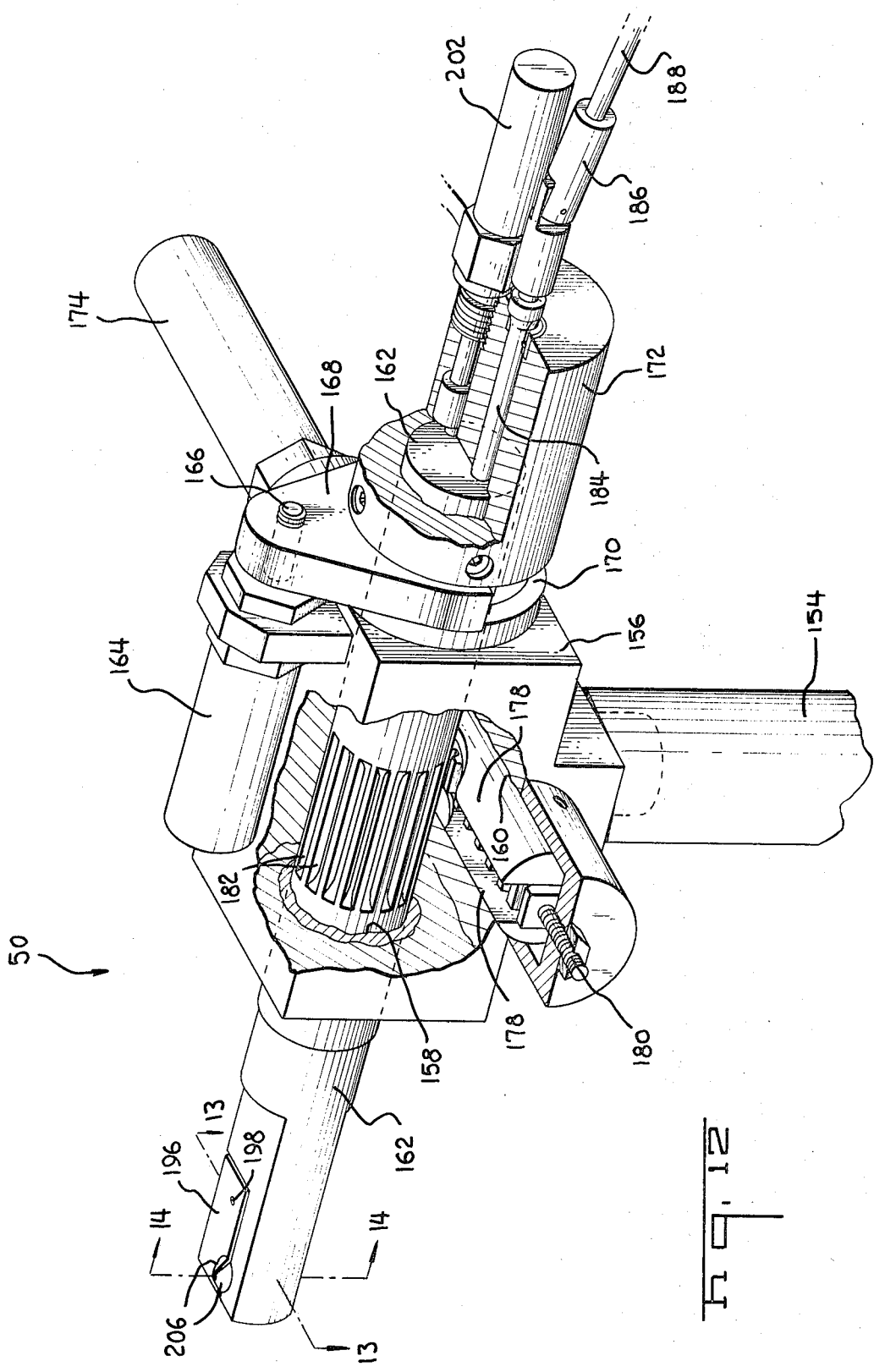

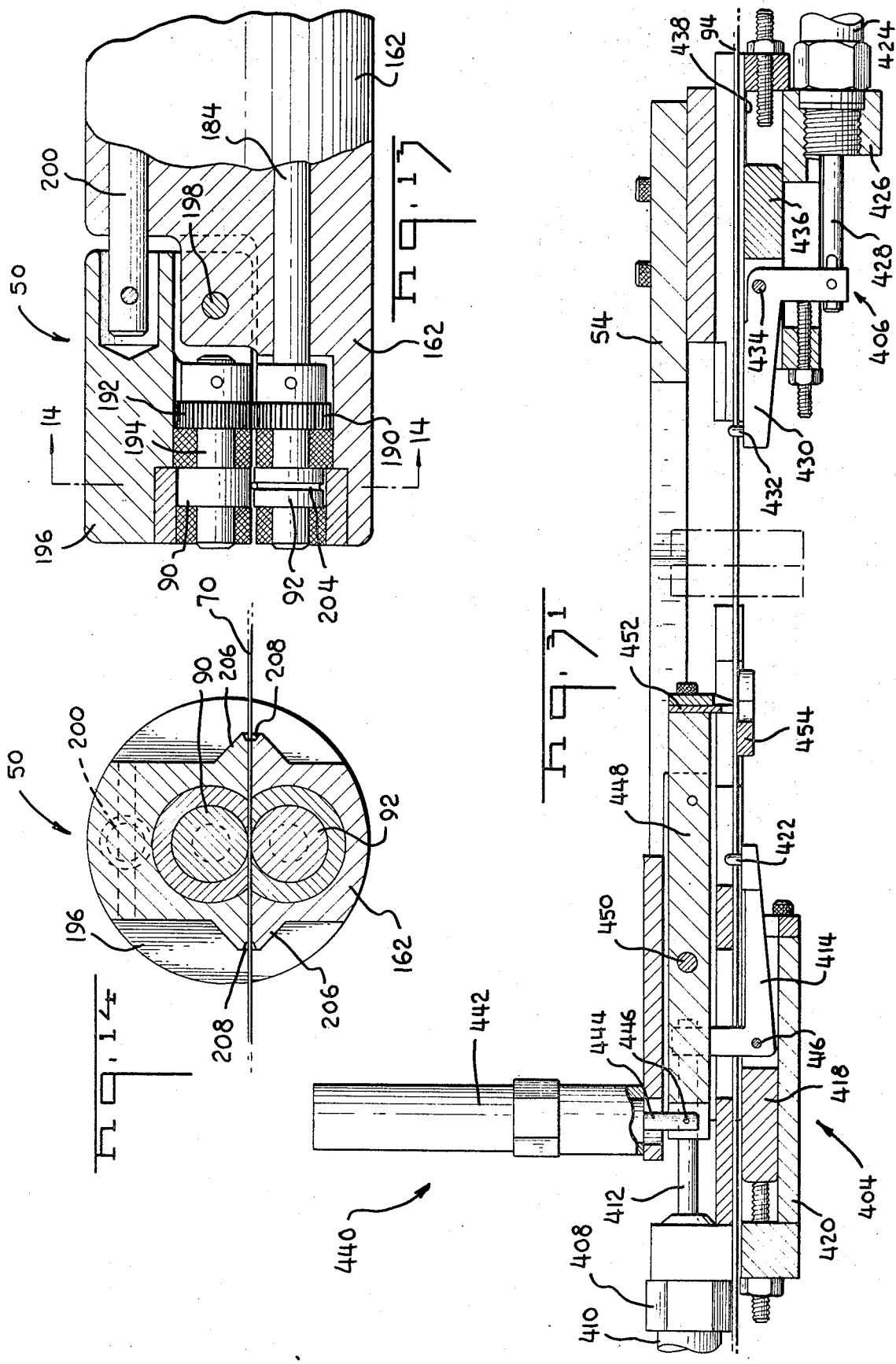

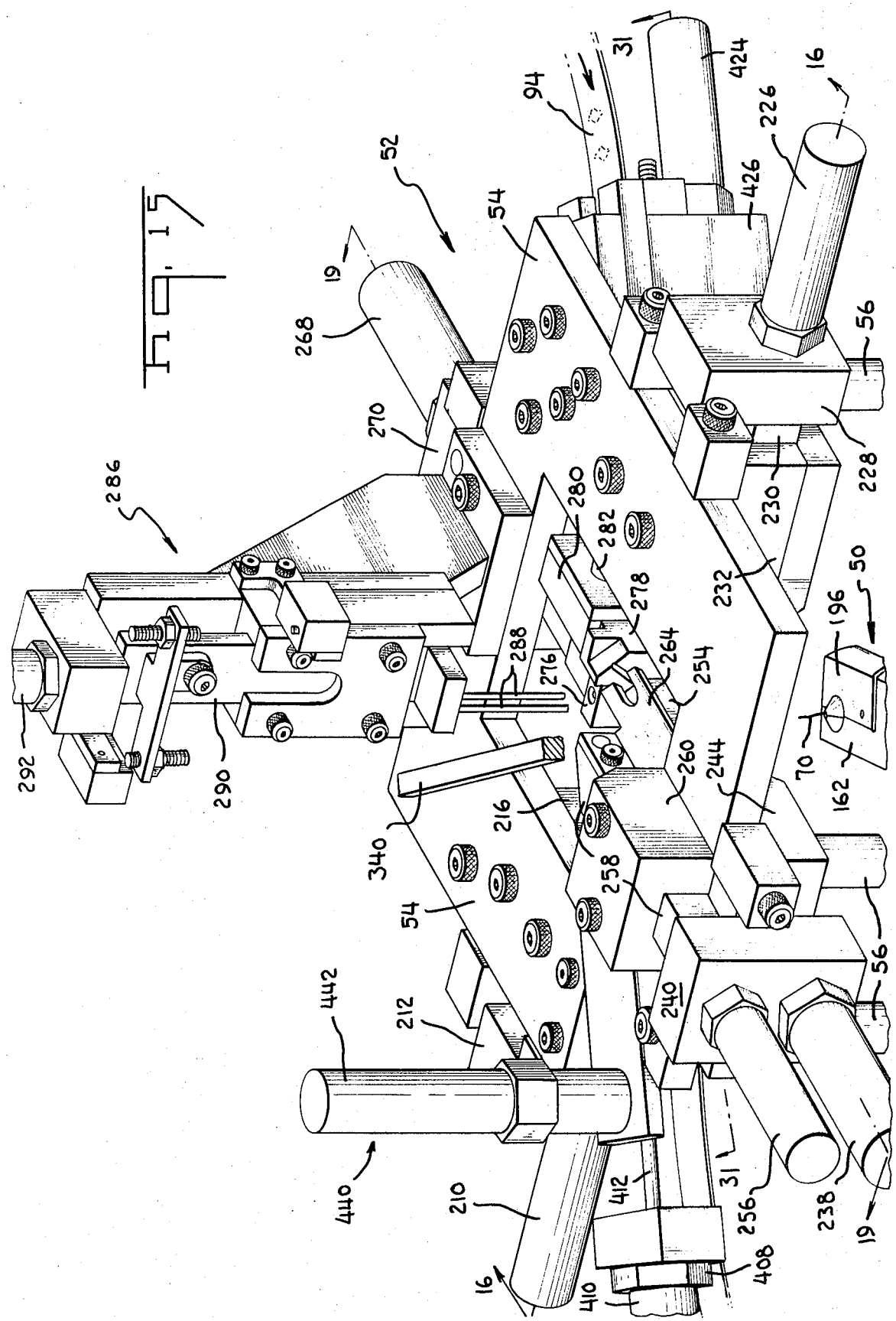

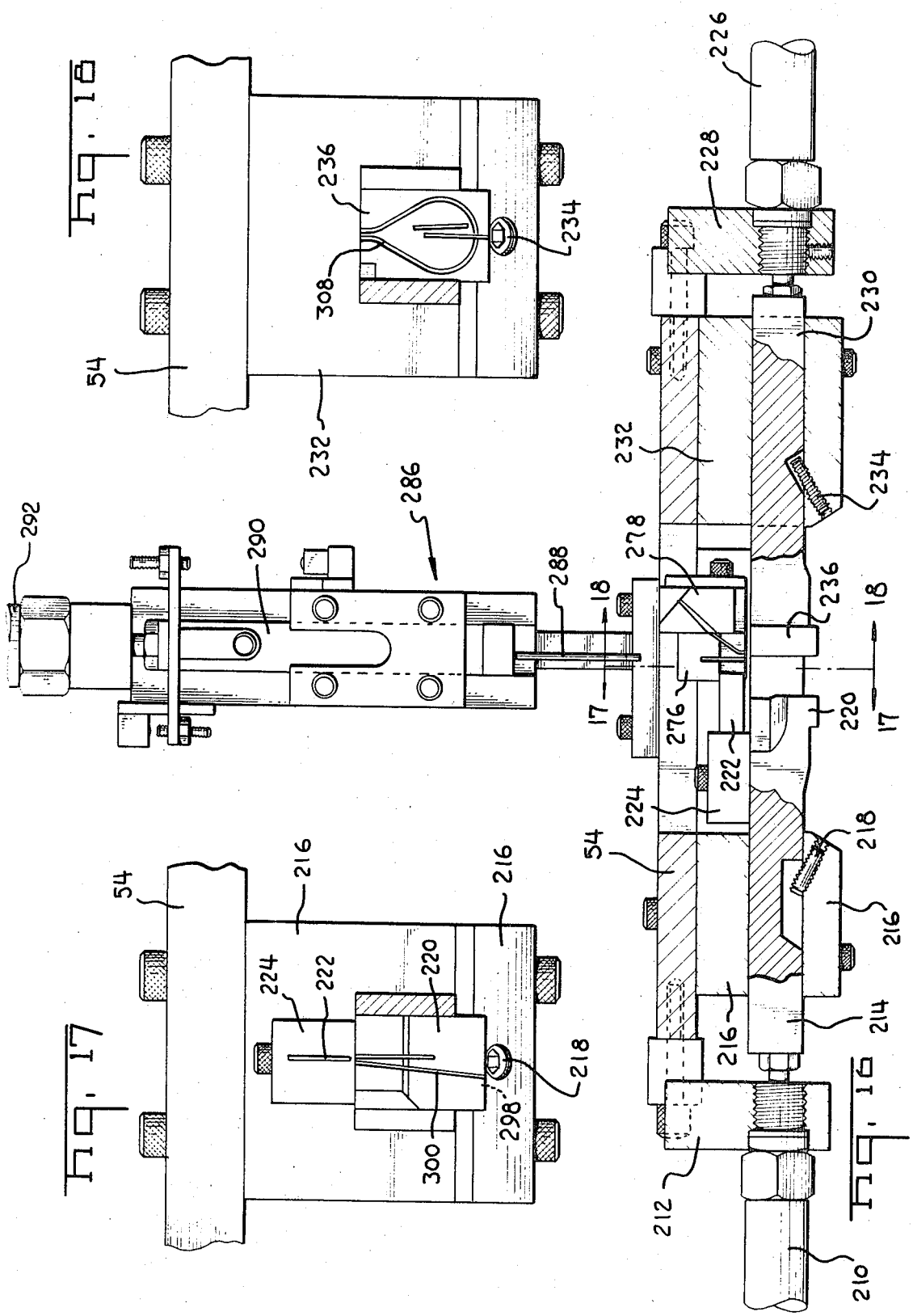

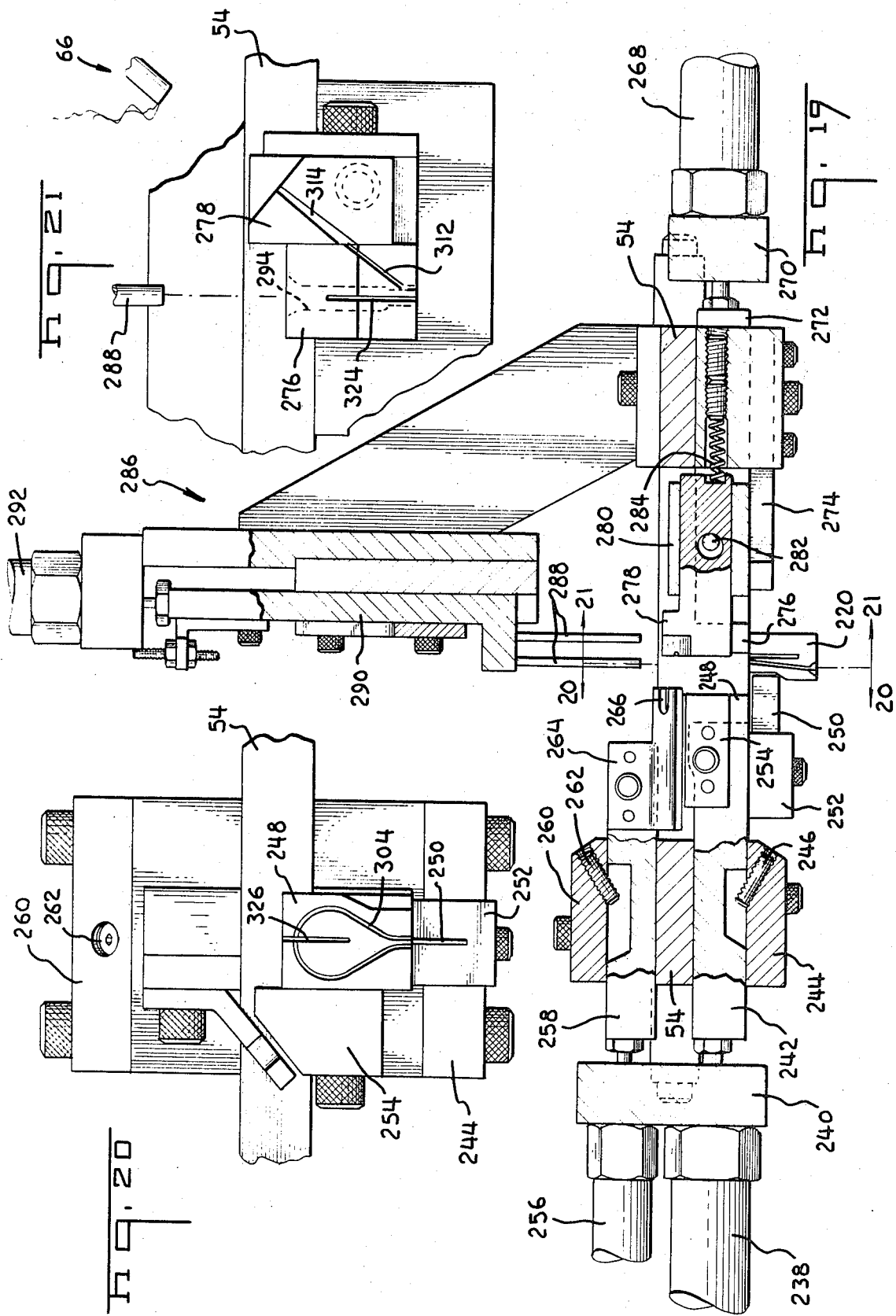

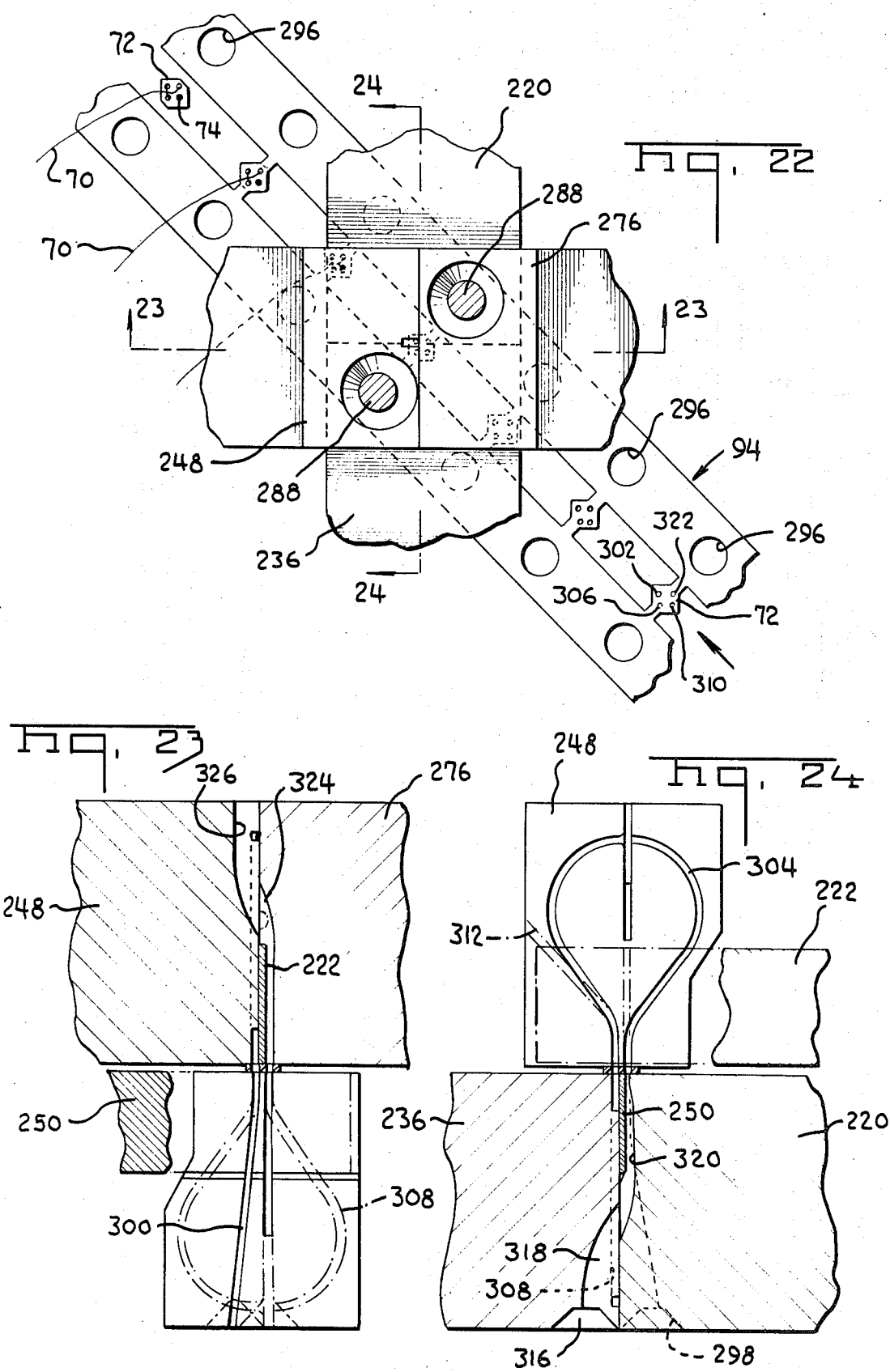

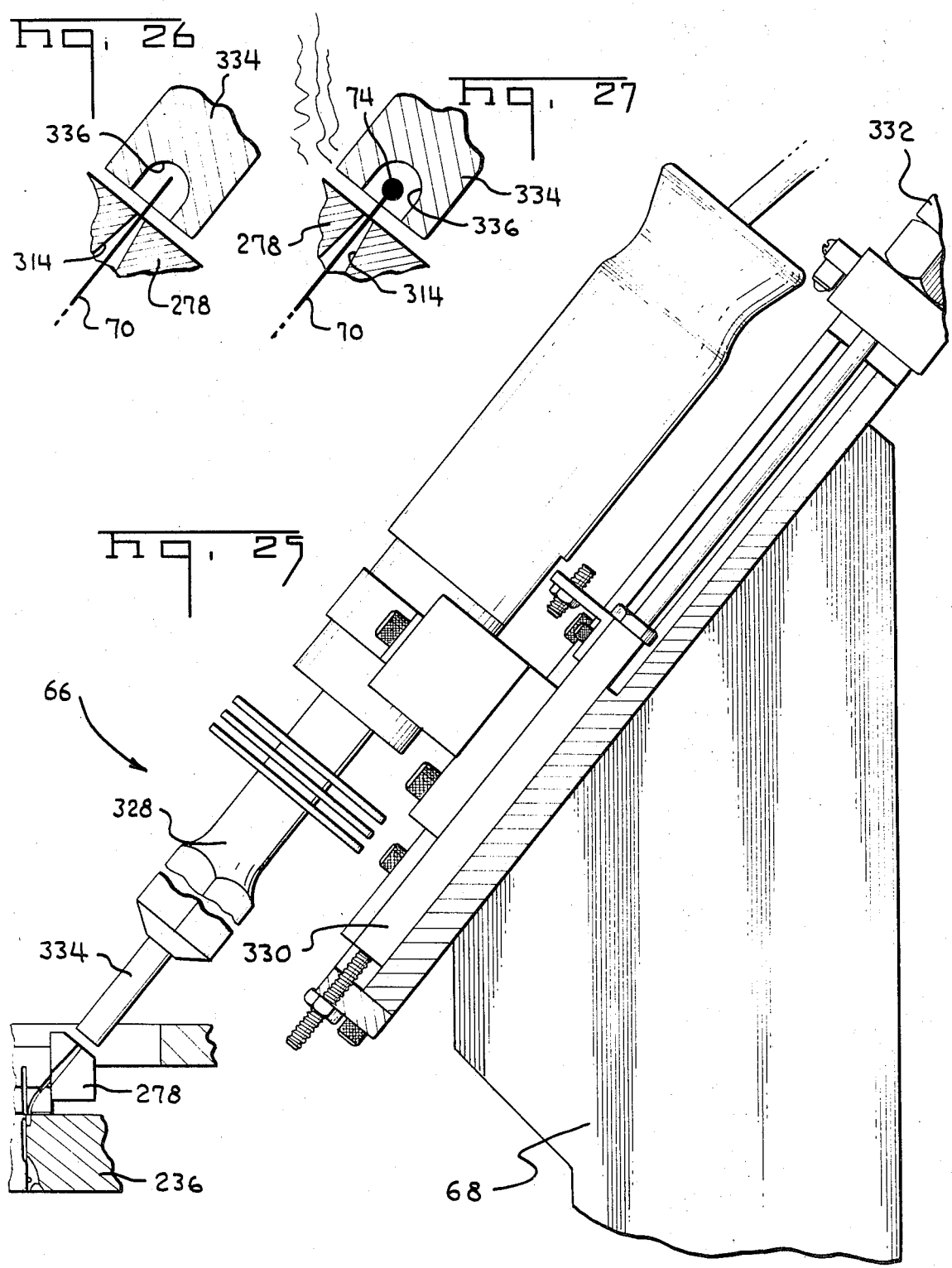

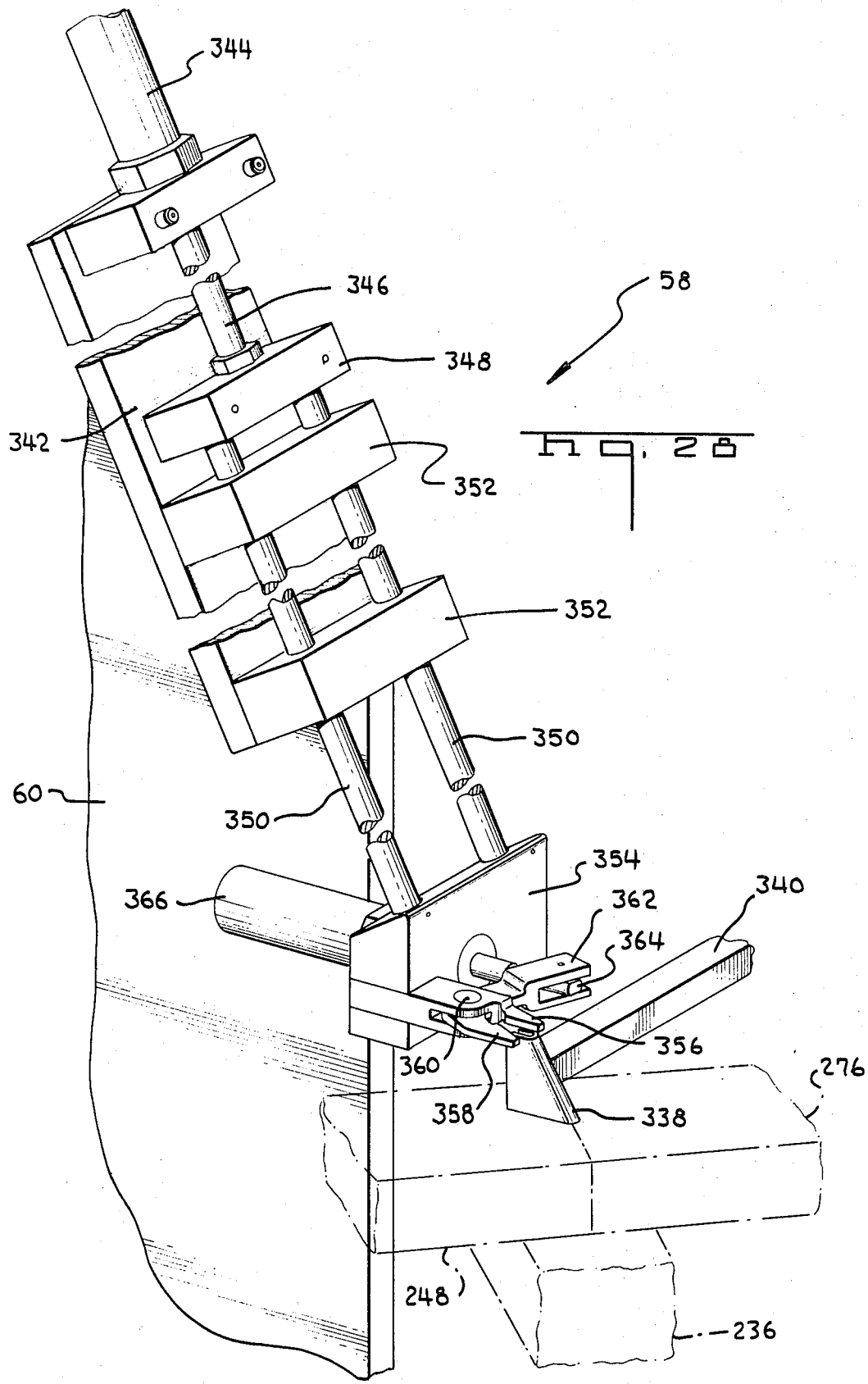

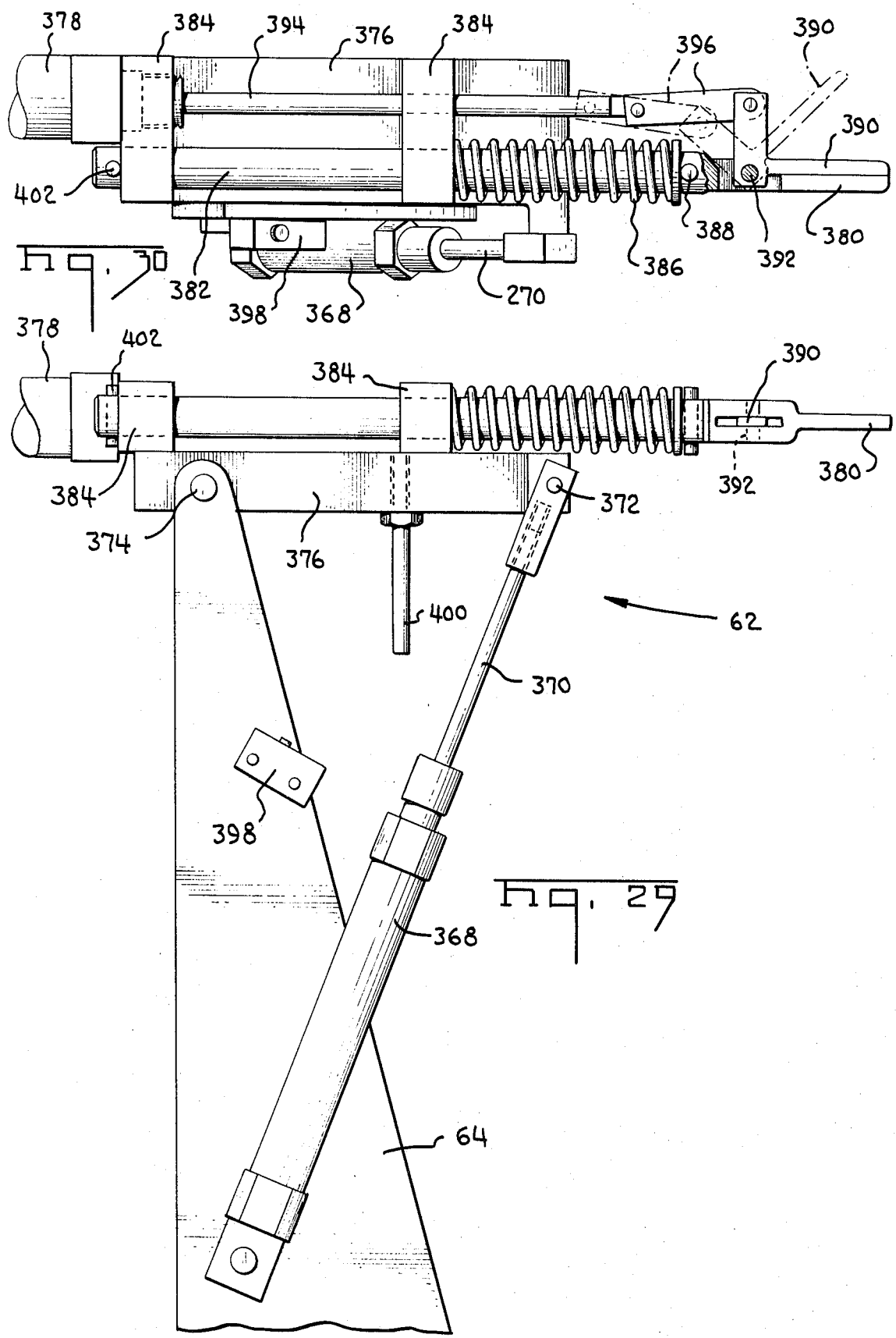

United States Patent Office 3,538,584
Patented Nov. 10, 1970

3,538,584
THREADING AND ASSEMBLING APPARATUS
Albert James Carpenter, Hanover, George Robert Metzdorf, Camp Hill, and Burnell Calvin Stambaugh, Hanover, Pa., assignors to AMP Incorporated, Harrisburg, Pa.
Filed Feb. 26, 1968, Ser. No. 708,053
Int. Cl. B23p 19/04
U.S. Cl. 29—208       20 Claims

ABSTRACT OF THE DISCLOSURE

An apparatus is provided for automatically threading a thin filamentary material through the apertures in a multi-apertured disk to provide an assembly which is of the lariat and honda type. The apparatus feeds a strip of apertured members to a work station and locates one of the members within a series of guiding dies. The filamentary material is fed to the work station and is guided by the dies through the various apertures in the member according to a predetermined threading pattern. The filamentary material is not rigid and therefore the guiding surfaces must be capable of permitting the passage of material at extremely low friction levels in order to prevent buckling of the material.

CROSS-REFERENCE TO RELATED APPLICATION

This application is usable, for example, in producing the device shown and described in U.S. patent application Ser. No. 494,103, filed Oct. 8, 1965, now Pat. No. 3,409,014, granted Nov. 5, 1968, and having a common assignee with the instant application.

SUMMARY OF THE INVENTION

In the above-identified copending application there is shown a minute button-like member which is threaded with a thin filamentary material in order to produce a tying arrangement suitable for use in ligating blood vessels during surgery. The size of the disk and thread make hand assembly impractical therefore requiring the creation of an entirely new type of threading apparatus which is specifically designed for use with miniature parts although the apparatus could be adapted for use with conventional size parts. The instant threading apparatus comprises four threading dies acting in pairs located on opposite sides of the member to be threaded. The dies have guide channels formed in their abutting faces to provide an enclosed pathway within which filamentary material can travel without buckling.

BRIEF DESCRIPTION OF THE DRAWINGS

FIG. 3 is a schematic view showing several of the basic parts of the apparatus in position at the beginning of a cycle;

FIG. 4 is a schematic view similar to FIG. 3 and showing the parts in position during a cycle;

FIG. 5 is a schematic view representing a later portion of the machine cycle;

FIG. 6 is a schematic view showing a still later portion of the cycle;

FIG. 7 is a schematic view showing the parts in position when the threading portion of the cycle is completed;

FIG. 8 is a schematic view showing the parts after the threaded assembly has been tightened and properly sized;

FIG. 9 is a perspective view of the feed-head assembly for feeding the filamentary material off of its supply source;

FIG. 10 is a cross-sectional view of the feed-head assembly taken along the line 10—10 of FIG. 9;

FIG. 11 is a cross-sectional view taken along the line 11—11 of FIG. 10 and showing further details of the feed-head assembly;

FIG. 12 is a perspective view of the wheel-head assembly which delivers the filamentary material from the feed-head assembly to the threading dies;

FIG. 13 is a cross-sectional view taken along the line 13—13 of FIG. 12 and showing details of the wheel-head assembly;

FIG. 14 is a view taken along the line 14—14 of FIG. 12 or 13 showing additional details;

FIG. 15 is a perspective view showing the threading area of the apparatus;

FIG. 16 is a view taken along the line 16—16 of FIG. 15 and showing a first pair of threading dies;

FIG. 17 is a view partly in section taken along the line 17—17 of FIG. 16 and showing the guide configuration in a first one of the threading dies;

FIG. 18 is a view partly in section taken along the line 18—18 of FIG. 16 and showing the guide configuration in a second one of the threading dies;

FIG. 19 is a cross-sectional view taken along the line 19—19 of FIG. 15 and showing a second pair of threading dies;

FIG. 20 is a view partly in section taken along the line 20—20 of FIG. 19 and showing the guide configuration in a third one of the threading dies;

FIG. 21 is a view partly in section taken along the line 21—21 of FIG. 19 and showing the guide configuration in a fourth one of the threading dies;

FIG. 22 is a top plan view showing the threading dies in their fully closed position;

FIG. 23 is a cross-sectional view taken along the line 23—23 of FIG. 22 and showing further details of the threading dies;

FIG. 24 is a cross-sectional view taken along the line 24—24 of FIG. 22 showing still further details of the threading dies;

FIG. 25 is a side elevational view of a heating means for treating an end of the filamentary material;

FIG. 26 is an enlarged cross-sectional view showing the positioning of the filamentary material within the heating means of FIG. 25;

FIG. 27 is an enlarged cross-sectional view showing means;

FIG. 28 is a perspective view of an upper gripper assembly for grasping the lead end of the filamentary material as it emerges from the threading dies;

FIG. 29 is a side elevational view of a lower gripper assembly for tightening the filamentary material after the threading operation;

FIG. 30 is a top view of the gripper assembly of FIG. 29; and

FIG. 31 is a cross-sectional view taken along the line 31—31 of FIG. 15 showing details of the means for feeding multi-apertured members to and from the threading location to receive the filamentary material.

DESCRIPTION OF THE PREFERRED EMBODIMENT

The attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

Figure 1:
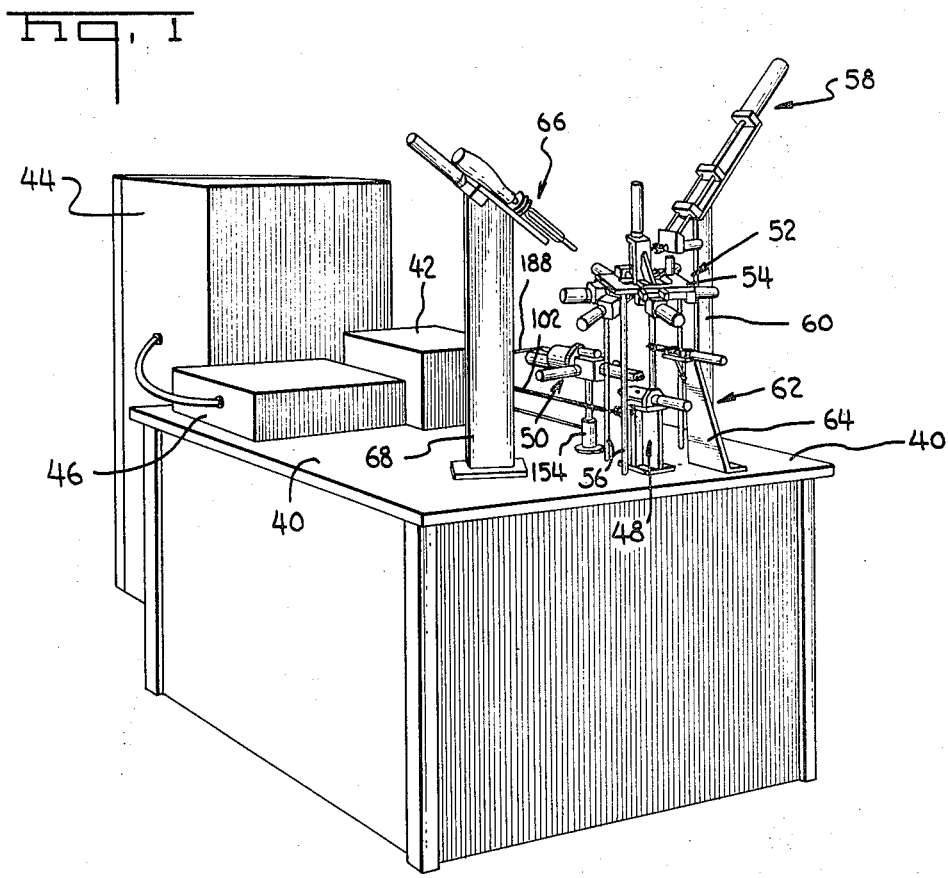
FIG. 1 is an overall perspective view of the threading aparatus of the present invention.

The threading and assembling apparatus of this invention comprises a plurality of complex subassemblies and the overall apparatus can be best described by individual treatment of these subassemblies. In FIG. 1 the subassemblies are shown in their relative positions all interacting to produce a unitary result. There is shown a main platform 40 below which is disposed the power train for driving the various parts of the apparatus. The power train is not specifically disclosed since it may take any of a number of various forms all within the skill of the art.

A transmission 42 is shown in schematic form and is suitably connected to the power train for regulating the flow of power to the various subassemblies of the invention. The transmission is controlled by suitable electronic timing circuitry 44 and by suitable mechanical timing means 46. The timing means 44 and 46 are conventional and may be suitably designed by a skilled artisan.

Beneath the main platform 40 there is disposed a supply source for filamentary material. The material is fed up through the platform by a feed-head assembly indicated generally at 48. The feed-head assembly delivers the material to a wheel-head assembly indicated generally at 50. The wheel-head assembly is operative to deliver the thread from the feed-head assembly to the main threading area indicated at 52. The area 52 is defined primarily by an upper table 54 which is supported above the main platform by a plurality of legs 56.

An upper gripper assembly 58 is suspended above the threading area by means of a pedestal 60. A lower gripper assembly 62 is mounted below the threading area by means of a pedestal 64. Also mounted on the main platform 40 is a hot-point 66 held above the main platform by pedestal 68.

Figure 2:
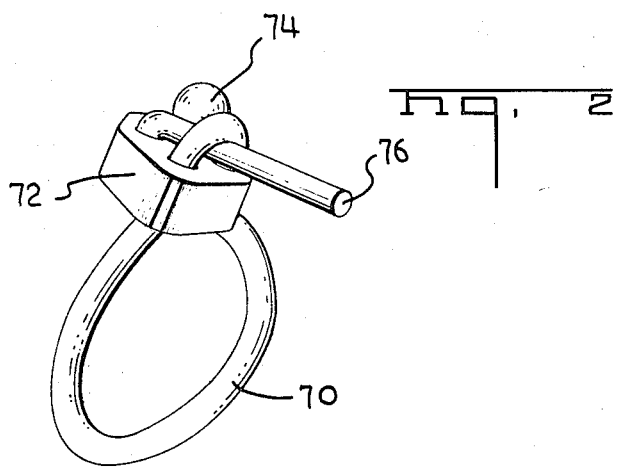
FIG. 2 is a perspective view showing a representative product threaded in accordance with the teachings of this invention.

The relative positions of each of the main subassemblies is now apparent. The functional interrelation between the subassemblies will become apparent as the description proceeds. The apparatus will be described with reference to the threading of a length of filamentary material 70 through a multi-apertured disk 72 as can be seen in FIG. 2. It will become obvious that the apparatus is not limited to the particular threading arrangement shown in FIG. 2 but rather this arrangement is being offered by way of example only. It is sufficient at this point to note that the threading arrangement of FIG. 2 shows the material 70 having an enlarged end portion 74 and a free end 76. The material makes a plurality of passes through disk 72 in accordance with a predetermined arrangement to produce the desired configuration.

With reference now to FIGS. 3–8 the complete cycle of the apparatus can be traced by the schematic representations. In FIG. 3 the various parts are shown in position at the start of a machine cycle. The filamentary material 70 is shown extending from a supply reel 78 located beneath platform 40 indicated in phantom. The material extends through the feed-head assembly 48 and is located between a pair of feed wheels 80 and 82 within the feed-head assembly. The filament then extends through the blades 84 and 86 of a cutting assembly 88. The cutting assembly is located adjacent the feed-head assembly and receives the filament exiting therefrom.

The wheel-head assembly 50 is located above the cutting assembly and receives the filament between a pair of feed wheels 90 and 92. The wheel-head assembly is capable of movement from a position adjacent the cutting assembly as shown in FIG. 3 to a position adjacent the multi-apertured disk 72 located above the wheel-head assembly. Disk 72 is preferably supplied in strip form as indicated at 94 to facilitate handling and positioning of the disk. An arm 96 is shown adjacent the wheel-head assembly and functions to take up slack in the material 70 during the threading operation. The upper gripper assembly 58 and the hot-point 66 are also shown in FIG. 3 in their positions at the start of the machine cycle.

In FIG. 4 the various parts are shown at a later point in the machine cycle. Feed wheels 80 and 82 of the feed-head assembly are rotating to draw the material 70 off of the supply reels 78. The wheel-head assembly 50 has moved to a position adjacent the disk 72 and the feed wheels 90 and 92 of the wheel-head assembly are rotating to feed the material 70 through the disk. The material travels through the disk along a predetermined path by guide means to be later described. During movement of the wheel-head assembly away from the feed-head assembly the feed wheels 90 and 92 rotate at a slightly slower speed than the feed wheels 80 and 82 of the feed-head assembly to prevent stretching and slipping of the material. The lead end of the material 70 is shown adjacent the hot-point 66 whereat the enlarged end 74 is formed. The formation of the enlarged end is caused by concentration of the heat supplied by the hot-point in a manner to be later described. It is sufficient at this point merely to indicate that the hot-point 66 has moved into position in FIG. 4 adjacent the end of the filamentary material.

After the formation of the end 74 on the material 70 the hot-point 66 retracts to a position as indicated in FIG. 5. Wheel-head assembly 50 has moved down to a position adjacent the cutting assembly 88 and during such movement the feed wheels 90 and 92 of the wheel-head assembly were caused to rotate faster than the feed wheels 80 and 82 of the feed-head assembly to maintain proper tautness in the material between the feed-head and wheel-head assemblies. Since material is still being fed from the supply reel 78 there is a build up of material above the wheel-head assembly and at this time the arm 96 is released to move across the path of the material 70 to take up slack between the wheel-head assembly and the disk 72. When the proper length of material 70 has been fed from the supply reel and feed wheels 80, 82, 90, and 92 stop rotating and the cutting assembly is actuated causing the material to be severed between the blades 84 and 86.

With reference now to FIG. 6 the cutter blades 84 and 86 are no longer in cutting position and the wheel-head assembly 50 has rotated 180 degrees thereby positioning the severed free end 76 for passage into the disk 72. The rotation of the wheel-head assembly 50 is slightly eccentric so that the free end 76 of the filamentary material is aligned with a different aperture in disk 72 from the aperture into which the material originally passed.

With reference now to FIG. 7 the free end 76 of the material is shown having passed through the disk 72 and into the jaws of the upper gripper assembly 58. The material is fed through the disk by the feed wheels 90 and 92 of the wheel-head assembly which feed wheels are rotating in the opposite direction from that of the earlier portions of the cycle. This change in direction is necessary of course because of the 180 degrees rotation of the entire wheel-head assembly. During the feeding of the material into the jaws of the upper gripper assembly the arm 96 is permitted to move to the left as seen in FIG. 7 thus permitting reduction in the amount of slack in the material 70. At this point in the cycle the actual threading of the disk 72 is completed but the material 70 is in a rather loose condition.

In FIG. 8 the upper gripper assembly 58 is shown after grasping the free end 76 of the filamentary material. The upper gripper assembly has retracted in order to reduce the size of the loop formed in the filamentary material beneath the disk 72. The wheel-head assembly 50 and the arm 96 are shown after having moved to a clearance position from the loop in the material 70 and the parts are back in position to begin the new cycle. The lower gripper assembly 62 now grasps the loop beneath the disk 72 and pulls downward on the material to tighten the tying arrangement through the disk. The upper and lower gripper assemblies 58 and 62 respectively then release the completed disk and filament assembly and permit removal of the assembly from the apparatus. The feed-head assembly 48 becomes operative again to withdraw material 70 from the supply reel to initiate a new machine cycle.

The feed-head assembly 48 will now be described with particular reference to FIGS. 9–11. The assembly is mounted on a main platform by means of a pedestal 98 suitably mounted on top of the platform. A journal 100 extends from a pedestal and receives a drive shaft 102 which extends from the main transmission 42. A bevel gear 104 is secured to the end of shaft 102 and mates with a corresponding bevel gear 106 secured to a shaft 108 suitably journaled in the pedestal 98. A gear 110 is fixed to shaft 108 and meshes with a gear 112 fixed to a shaft 114 which shaft is mounted for rotation on pedestal 98 by means of bearings 116. It can be seen that rotation of drive shaft 102 will cause rotation of shaft 108 through pinion gears 104, 106. Rotation of shaft 108 can be seen to cause rotation of shaft 114 through meshing gears 110, 112.

Feed wheel 80 is secured to shaft 114 for rotation therewith. Shaft 114 carries a gear 118 which gear meshes with a mating gear 120 carried on a shaft 122. The shaft 122 is mounted in bearings 124 for rotation in a pressure block 126. The block 126 is slidably mounted on pedestal 98 and is biased by spring means 128. Feed wheel 82 is carried by shaft 122 and cooperates with feed wheel 80 for feeding the filamentary material 70. The spring 128 which biases pressure block 126 serves to maintain pressure between the feed wheels 80 and 82. Wheel 80 has a circumferential groove 130 disposed therearound to assist in feeding and orienting the material 70.

The material 70 passes through an opening 132 in the pedestal 98 and proceeds between the pedestal 98 and the pressure block 126. As the material exists from the feed wheels 80, 82 it passes through an aperture 134 provided in the movable cutter blade 84. The fixed cutter blade 86 also has an aperture 136 through which the material 70 extends.

A block 138 is secured to pedestal 98 and carries an air cylinder 140. The cylinder is connected to a suitable fluid source and has a reciprocable piston rod 142. The rod terminates in a clevis 144 within which is mounted the movable blade 84. It can be seen that movement of piston rod 142 to the left as seen in FIG. 10 will cause the movable blade 84 to move to the left relative to blade 86 causing misalignment between apertures 134 and 136. Such misalignment will cause the material 70 to be severed at the point between the cutting blades.

A spring means 146 resiliently urges the top blade 86 towards the movable blade to insure a clean cutting action between the blades. Clevic 144 also carries an actuating member 148 which contacts a microswitch 150 upon movement the piston rod 142 thus signaling completion of the cutting operation and actuation of the next portion of the machine cycle.

At the filamentary material 70 exits from the cutter blades 84 and 86 of the cutting assembly it enters the wheelhead assembly 50. A recessed area 152 is provided in blade 86 for permitting the wheel-head section assembly to move into close proximity to the cutting assembly to insure proper alignment between the assemblies.

The wheel-head assembly is best seen in FIGS. 12 through 14. The assembly is suspended on an elevating shaft 154 which shaft is capable of vertical rectilinear motion suitably controlled by the transmission 42. A housing 156 is keyed to shaft 154 and has a pair of perpendicularly disposed passageways 158 and 160 disposed therein.

A shaft 162 extends through the passageway 158 in the housing and is suitably mounted to permit axial movement of the shaft relative to the housing. Axial reciprocation of shaft 162 is controlled by means of an air cylinder 164 mounted on housing 156 and suitably connected to a fluid source. The cylinder has a piston rod 166 to which is pinned a fork 168. The lower end of fork 168 straddles the shaft 162 and is positioned between a circumferential flange 170 formed on the shaft and an abutment member 172 pinned to the end of shaft 162. Extension of the piston rod 166 will cause the fork 168 to move generally to the right as seen in FIG. 12 bearing against the abutment member 172 thus causing shaft 162 to move generally rightward. Such movement results in moving the wheel-head assembly out of alignment with the feed-head assembly for a purpose to become apparent. Retraction of piston rod 166 can be seen to cause the shaft 162 to move generally leftward as seen in FIG. 12 to restore the wheel-head assembly into alignment with the feed-head assembly.

A cylinder 174 is secured to housing 156 and is connected to a suitable fluid source. The piston rod of cylinder 174 carries a rack 176 which reciprocates within the passageway 160 in the housing. Rack 176 is guided in its movement by member 178 located in the passageway 160. Suitable stop means 180 are provided for limiting the extent of axial reciprocation of the rack.

The earlier description set forth that the wheel-head assembly rotated through 180 degrees in a clockwise direction as seen in FIG. 6 to permit the free end 76 of the filamentary material to be threaded into disk 72. The wheel-head assembly also was described as rotating 180 degrees in a counter-clockwise direction as seen in FIG. 8 to bring the assembly back to its initial position. This rotation of the wheel-head assembly is effected by the cylinder 174. Shaft 162 is provided with axial splines 182 which engage the rack 176. Reciprocation of rack 176 by the cylinder 174 will cause the shaft 162 to rotate through its required 180 degrees in either direction dependent upon the direction of movement of rack 176. The splines 182 are of sufficient axial length to insure engagement between the splines and the rack 176 during each of the limits of axial movement of shaft 162 as caused by the cylinder 164.

Shaft 162 carries the feed wheels 90 and 92 previously described. Feed wheel 92 is keyed to a drive shaft 184 which extends axially through the shaft 162 and is connected by a universal joint 186 to a telescoping shaft 188 extending from the transmission 42. The universal joint 186 and telescoping shaft 188 permit the shaft 184 to be driven while the wheel-head assembly is an any of its vertical positions as determined by elevating shaft 154 and in any of its rotative positions as determined by cylinder 174 and in any of its aligned positions as determined by cylinder 164.

Shaft 184 is mounted on suitable bearings adjacent the feed wheel 92 and carries a pinion gear 190 which meshes with a gear 192 carried by an idler shaft 194 mounted in suitable bearings within a block 196. The block 196 is carried at the end of shaft 162 and is pivotally connected thereto by pin means 198. Block 196 is pivotable relative to shaft 162 by means of a shaft 200 which extends through the cylinder 162 parallel to the shaft 184, the shaft 200 being connected to the piston rod of a cylinder 202 whereby actuation of the cylinder will cause shaft 200 to move axially relative to the shaft 162. Shaft 200 is pinned to the block 196 whereby axial movement of shaft 200 will cause pivotal movement of block 196 about the pin 198.

Feed wheel 90 is carried by idler shaft 194 so that rotation of shaft 184 will cause the two feed wheels 90 and 92 to rotate together through the gears 190, 192. Feed wheel 92 has a circumferential groove 204 which is generally complementary to the shape of filament 70. The shaft 162 and block 196 are each formed with a pair of truncated cones 206. The cones are split to be formed one-half in the shaft 162 and one-half in the block 196. Cones 206 have enlarged entrance apertures 208 to permit lead in of the filamentary material 70. It can be seen that the cones are in alignment with the feed wheels 90 and 92 to guide the filamentary material through the wheel-head assembly. Cones 206 are positionable within the recessed area 152 formed in the cutting assembly to thereby permit the wheel-head assembly to move into close proximity with the feed-head assembly to insure proper movement of the filament 70 through the apparatus.

With reference back to FIGS. 3 through 8, the wheel-head assembly as shown in FIG. 12 is in the position which corresponds to that portion of the cycle shown in FIG. 3, namely the beginning of a machine cycle. The feed wheels 90 and 92 are caused to rotate by the shaft 184. As the machine cycle moves from that shown in FIG. 3 to that shown in FIG. 4 the assembly 50 is elevated by the shaft 154 and during such elevation the speed of rotation of feed wheels 90 and 92 is slightly reduced by the transmission 42. As the machine cycle moves to that shown in FIG. 5 the wheel-head assembly 50 is lowered by shaft 154 and during such lowering the speed of rotation of feed wheels 90 and 92 is reduced slightly by the transmission 42. Rotation of the feed wheels is then stopped and the assembly is caused to rotate through 180 degrees. This rotation is seen in FIG. 6 and is effected by the cylinder 174 causing the rack 176 to be retracted thus rotating shaft 162 through the splines 182. After the 180 degree rotation the assembly is again elevated by shaft 154 and the feed wheels 90 and 92 are rotated causing the end 76 of the filament to be fed through the disk 72. When sufficient material has been fed through the disk the feed wheels are stopped and the wheel-head assembly must then return to its starting position. In order to free the wheel-head assembly from the filamentary material, cylinder 202 is actuated causing retraction of shaft 200 thus pivoting block 196 away from the shaft 162. This causes feed wheels 90 and 92 to separate to free the material 70 passing therebetween. Cylinder 164 is then actuated causing the shaft 162 to move axially to the right as seen in FIG. 13 thus completely removing the wheel-head assembly from the path of the filamentary material. In this position the wheel-head assembly can then be rotated back to its initial starting position as seen in FIG. 8, this rotation being caused by the cylinder 174 being actuated to extend the rack 176 to the position as seen in FIG. 12.

Turning now to FIG. 15 there is shown the threading area 52 which represents the heart of the apparatus. The filamentary material 70 can be seen entering the threading area from beneath the upper table 54 and the strip 94 of apertured disks can be seen to extend through the threading area and moves from right to left as seen in the figure.

The table 54 is supported by the legs 56 above the main platform 40 and the table supports the mechanism for guiding the material 70 through the apertured disks 72 on the strip 94. A fluid cylinder 210 is mounted on the table 54 by means of a bracket 212. The cylinder has a piston rod 214 (see FIG. 16) mounted for reciprocating movement between a pair of guides 216 suspended from the table 54. A stop member 218 located in the lower guide 216 limits the extent of movement of the rod 214.

The piston rod 214 carries a die 220 at its end, the said die being one of four cooperating dies which guide the filamentary material through the aperture disk. Also carried by the rod 214 is a separator 222 in the form of an elongated blade extending from a bracket 224 secured to the piston rod. The separator 222 and die 220 are movable in unison back and forth under the influence of the cylinder 210.

A second cylinder 226 is secured to the table 54 by means of a bracket 228. The cylinder has a piston rod 230 which is mounted for reciprocating movement between a pair of guides 232 depending from the table 54 in a similar manner as the guides 216 previously described. A stop member 234 limits the extent of reciprocating movement of the rod 230 and as can be seen in FIG. 16 the rod 230 reciprocates for only a very short distance. A die 236 is carried at the end of piston rod 230 and cooperates with the die 220 to form a first pair of guiding dies for the threading operation. The dies 220 and 236 may be considered as lower guiding dies in that they are physically located beneath the line of travel of the strip 94 carrying the multi-aperture disks.

At right angles to the cylinders 210 and 226 there are disposed on the table 54 additional cylinders for controlling the movement of the upper pair of guide dies. A cylinder 238 is mounted on the table 54 by means of a bracket 240 and has a piston rod 242 mounted for reciprocating movement between the table 54 and a lower guide member 244. A stop member 246 located in the guide member 244 limits the extent of reciprocating movement of the rod 242. Secured to the rod 242 is a guide die 248 constituting one-half of the upper pair of guide dies. A separator 250 in the form of an elongated blade extends from a bracket 252 which is also carried by the rod 242. Located adjacent the die 248 and also carried by rod 242 is a heat sink 254 suitably formed of copper for a purpose to be later described.

An additional cylinder 256 is carried by the bracket 240 and operates a piston rod 258 which reciprocates between the table 54 and an upper guide block 260. A stop member 262 located in a guide block regulates the extent of reciprocation of rod 258. The rod 258 carries at its end a pushing member 264 which functions to properly space the heat sinks on opposite sides of the filamentary material 70. A recssed portion 266 is provided on the pusher to permit entry of the hot-point in a manner to be described.

Directly opposite to the cylinder 238 is a further cylinder 268 which is carried adjacent table 54 by means of a mounting bracket 270. The cylinder operates a piston rod 272 which reciprocates between the table 54 and a guide member 274. A guide die 276 is carried by the piston rod and cooperates with die 248 to form the upper pair of guide dies.

A heat sink 278 is carried by a U-shaped bracket 280 mounted on the piston rod 272. The heat sink is capable of limited movement relative to bracket 280 through a pin and slot connection 282. Spring means 284 biass the heat sink to its forward position relative to the bracket. The heat sink is pushed to its rearward position against the bias of spring 284 by the pusher 264 as will become apparent when the thrading cycle is described in detail.

An aligning mechanism 286 is supported above the table 54 and comprises a pair of aligning pins 288 carried on the lower end of a slide 290. The slide is suitably guided for rectilinear reciprocation under the influence of a fluid cylinder 292. The aligning pins 288 are operative to properly position the four guide dies and the strip 94 of multi-apertured disks. Each of the dies is provided with an aligning aperture 294 through which the pins may extend and the strip 94 is provided with apertures 296 for receiving the aligning pins. Due to the extreme miniaturization of the guide dies and filamentary material 70 it is extremely important that the dies and the strip 94 be precisely located in order to allow the strip to pass properly through the serpentine path created by the guide dies. This precise alignment is made possible by the pins 288.

A cycle will now be described tracing the path of the filamentary material 70 through the guide dies. The material is introduced to the dies by the wheel-head assembly 50. The lead end of the material 70 enters a first opening 298 located in the lower guide die 220 (FIGS. 23 and 24). At this point all four dies are of course in their closed position and the piston rods of the cylinders 210, 226, 238, 256, and 268 are in their extended position. In this position pusher 264 is acting against the heat sink 278 to maintain the heat sink out of contact with heat sink 254 thus permitting filamentary material to pass between the two members. The material entering opening 298 proceeds along the guideway 300 and through a first aperture 302 in the disk (FIG. 22). As the material emerges from aperture 302 it is led by the separator 222 into guideway 304 located in the guide die 248. Guideway 304 is best seen in FIGS. 20 and 24 and forms one of the loops in the final knot configuration. As the material emerges from guideway 304 it passes downwardly through a second aperture 306 in the disk 72. The material emerging from aperture 306 is led by the separator 250 into the guideway 308 formed in lower guide die 236. Guideway 308 is best seen in FIGS. 18 and 23 and can be seen to form the second loop of the knot configuration, this loop being located on the lower side of the multi-apertured disk. The material which emerges from guideway 308 passes through a third aperture 310 in the disk 72 and is then led by separator 222 into the exit passageway 312 in upper guide die 276 (see FIG. 21). Guideway 312 leads into a further guideway 314 located in the heat sink 278. When the lead end of the filamentary material emerges from guideway 314 the feed from the wheel-head assembly is stopped as previously described and cylinder 256 is actuated to withdraw the pusher 264 thus permitting heat sinks 254 and 278 to close around the filamentary material. The hotpoint 66 is then actuated to form an enlarged end 74 on the material in cooperation with the heat sinks 254 and 278. Details of the hot-point will be later described.

At this point the wheel-head assembly has turned through 180 degrees and is in a position to feed the trailing end of the filamentary material through a second opening 316 in the guide dies. Opening 316 is located in lower guide die 236 and leads the material into guideway 318 in the die 236. The material traveling through guideway 318 is caused to be deflected by separator 250 into an additional guideway 320 located in the guide die 220 thus causing the filamentary material to have passed through the lower loop formed by guideway 308. The material that emerges from guideway 320 then passes through the fourth aperture 322 in the disk 72 and then proceeds into guideway 324 located in the upper guide die 276. Separator 222 holds the material in guideway 324 and then permits the material to move into the guideway 326 located in upper guide die 248 as best seen in FIG. 23. The change over from guideway 324 to guideway 326 causes the material to travel through the upper loop formed by guideway 304 to complete the knot configuration. The material which emerges from guideway 326 is then grasped by the upper gripper assembly 58, which assembly will be described in detail.

The hot-point 66 is shown in FIG. 25 and stands on the pedestal 68 above the main table. The hot-point may conveniently be in the form of a soldering iron or similar element 328 and is mounted on a slide 330 which is caused to reciprocate by a fluid cylinder 332. The nose portion 334 of the hot-point has a recessed end section 336 for receiving the end of a filamentary material as it emerges from guideway 314. The end 334 is moved by cylinder 332 into close proximity to the heat sinks 278 and 254 although the hot-point never actually comes into contact with the filamentary material. The enlarged end 74 is formed on the material by heat radiation. The purpose of the heat sinks is to confine the deformed material to the very end of the filament without permitting any of the remainder of the filament to be affected by the heat. When the end 74 is formed cylinder 332 causes the slide 330 to be retracted thus withdrawing the hot-point from the filamentary material.

The threading of the filamentary material through the guide dies as previously described will, of course, leave the various loops in an opened condition thus requiring tightening and sizing of the loop configuration after the threading guides have been retracted. Therefore upper and lower gripper assemblies 58 and 62 respectively are provided and are shown in FIGS. 28 through 30. Referring first to FIG. 28, the material which emerges from aperture 322 in the disk 72 is led through a guide chute 338 to the upper gripper assembly. Chute 338 is positioned at the end of an arm 340 which is suitably mounted on the table 54. The upper gripper assembly is suspended on a pedestal 60 and is guided in its movement by a bracket 342 mounted on the pedestal. A fluid cylinder 344 is secured to the bracket and carries a piston rod 346 to which is secured a ram 348. A pair of guide rods 350 extend from the ram 348 and are guided for rectilinear movement by the guides 352 secured to the bracket 342. The guide rods are rectilinearly movable by the cylinder 344. The guide rods carry at their lower end a mounting bracket 354 carrying the gripper jaws. A first jaw 356 is rigidly secured to the bracket 354 while a second jaw 358 is pivotally secured to the jaw 356 by pivot pin 360. Jaw 358 has a bifurcated end portion 362 which receives the piston rod 364 of an additional cylinder 366 carried on the bracket 354. It can be seen that retraction of piston rod 364 will cause the movable jaw 358 to move into contact with fixed jaw 356 to thus grip the filamentary material therebetween. Retraction of cylinder 344 will then cause the filamentary material to be pulled upwardly through the disk apertures to thus cause tightening of the knot and proper sizing of the noose formed in the filamentary material.

Additional tightening of the knot configuration is performed by the lower gripper assembly described in FIGS. 29 and 30. The assembly 62 is mounted on the pedestal 64 above the main platform 40 and below the upper table 54. A first cylinder 368 is pivotally secured to the pedestal 64 and carries a piston rod 370 which is pivotally connected at 372 to the gripper assembly. It can be seen that retraction of rod 370 will cause the gripper assembly to swing in a downward direction around a pivot joint 374 whereas extension of the rod 370 will cause raising of the gripper assembly to a position closely adjacent the lower pair of guide dies.

Pivot points 374 and 372 are connected to a platform 376 which carries a second cylinder 378. The cylinder 378 controls the opening and closing of the jaws of the gripper assembly and in addition controls the positioning of the jaws in their extended or retracted positions. A first jaw 380 is mounted at the end of an elongated member 382 which is slidably mounted on the platform 376 by means of guide members 384. FIG. 30 shows the jaw 380 in its extended position under the influence of a spring 386 acting between the forward guide 384 and an abutment member 388 carried on the member 382. A second jaw 390 is pivotally secured to the jaw 380 by pin means 392 and is movable towards and away from the jaw 380 by the piston rod 394 of the cylinder 378. Rod 394 is connected to the jaw 390 by a connecting link 396. In operation the cylinder 378 will extend rod 394 thus closing the jaws 380, 390 to grasp the material 70 directly under the guide dies. Cylinder 368 will be actuated to cause retraction of rod 370 thus causing the lower gripper assembly to pivot downwardly thereby performing the final tightening of the knot configuration around the apertured disk 72. When the gripper assembly has moved downward a sufficient distance to properly tighten the filamentary material a microswitch 398 located on pedestal 64 will be contacted by a pin 400 suspended from the platform 376. The microswitch will deactivate cylinder 368 and will cause actuation of cylinder 378 to retract rod 394 thus opening the gripping jaws to release the filamentary material. Retraction of rod 394 will also cause the elongated member 382 to move against the bias of spring 386 thereby moving the gripper assembly out of the way for removal of the filament and disk from the machine. The gripper assembly will then be raised to its initial position by extension of rod 370 to raise the platform 376 to the position shown in FIG. 29. When pressure is released in cylinder 378 the spring 386 will again cause the gripper assembly to move to the right as seen in FIG. 30 until an abutment member 402 contacts rear guide 384 thus limiting movement of the gripper assembly to its proper position underneath the guide dies. Subsequent actuation of cylinder 378 will again cause gripping jaw 390 to pivot into engagement with jaw 380 to grip the filamentary material during the next machine cycle.

In FIG. 31 there is shown the mechanism for feeding the strip 94 of apertured disks through the threading area of the apparatus. A pair of feed assemblies 404 and 406 operate in unison on opposite sides of the threading dies to properly feed the strip 94 in an intermittent manner through the threading area. The feed assemblies are suitably secured to the upper table 54 and are located at 45 degrees from the cylinders for controlling the guide dies. Looking first at assembly 404, a bracket 408 is secured to the table 54 and supports a cylinder 410. The cylinder has a piston rod 412 pivotally connected at its end to a feed pawl 414. The pawl is pivoted at 416 to a slide member 418 guided for reciprocation by a guide member 420 secured to the table 54. The feed pawl has a pair of fingers 422 at its end which engage the apertures 296 in the strip 94. It can be seen that extension of rod 412 will cause clockwise movement of feed pawl 414 to move the fingers 422 out of engegement with the strip. Continued extension of rod 412 will cause the feed pawl and slide 418 to move to the right as seen in FIG. 31 to position the fingers 422 under succeeding apertures in the strip 94. Cylinder 410 will then cause the rod 412 to be retracted to first cause the feed pawl to pivot in a counter-clockwise direction thus moving the fingers 422 into engagement with the strip and continued retraction of rod 412 will cause the feed pawl and slide to move to the left to thus index the strip in preparation for a threading cycle.

The assembly 406 is similar to assembly 404 and comprises a cylinder 424 mounted in a bracket 426 secured to the table 54. A piston rod 428 is pivotally secured to a feed pawl 430 having fingers 432 for engaging the apertures 296 in the strip 94. The feed pawl is pivoted at 434 to a slide member 436 which is guided for rectilinear movement by guide members 438. It can be seen that extension of rod 428 will cause the pawl 430 to pivot clockwise thus moving the feed fingers 432 into engagement with the strip and continued extension of rod 428 will cause the feed pawl and the slide 436 to move leftward thus indexing the strip 94 into position for threading operation. Retraction of rod 428 will cause the feed pawl to move in a counter-clockwise direction thus releasing the feed fingers from the strip and subsequently causing the feed pawl and slide 436 to move rightward thus positioning the pawl under succeeding apertures 296 in the strip 94 in preparation for the next threading cycle.

Also mounted on upper table 54 is the cut-off assembly 440 for separating the threaded disk from the strip 94. The assembly comprises a fluid cylinder 442 secured to the table and having a piston rod 444 extending therefrom and pivotally secured at its end by a pin 446 to the cut-off arm 448. The cut-off arm is pivotable about a pin 450 extending from the upper table. The cut-off arm carries a cutting blade 452 adjacent its end which blade cooperates with a stationary cutting anvil 454 located directly under the path of movement of the strip 94. Blade 452 is suitably provided with a bifurcated cutting edge to sever the multi-aperture disk around both side edges to thus free the disk from strip 94. It can be seen that actuation of cylinder 442 will cause retraction of piston rod 444 thus causing clockwise movement of the cut-off arm to thereby bring the cutting blade 452 into cutting engagement with the anvil 454. Extension of rod 444 will return the cut-off arm to its original position.

Throughout the above description there has been reference to a large number of fluid cylinders and other control mechanisms for which there must of course be provided suitable timing mechanisms in order to properly correlate movement of the various portions of the overall apparatus. Such timing means has not been described since it is well within the skill of the art to provide suitable timing mechanisms for this purpose.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. Apparatus for threading elongated flexible material through a multi-apertured member, said apparatus comprising a first pair of dies having cooperating confronting faces, guide means disposed in at least one of said faces and defining a passageway for guiding said material therethrough, a second pair of dies having cooperating confronting faces, further guide means disposed in at least one of said faces of said second pair of dies and defining a passageway for guiding said material therethrough, and locating means for locating said multi-apertured member adjacent said first and second pair of dies and in alignment with said guide means thereof whereby movement of said material through said passageways will cause threading of said multi-apertured member.

2. Threading apparatus as set forth in claim 1 further comprising feed means for feeding said material through said passageways.

3. Threading apparatus as set forth in claim 1 further comprising separator means located between said confronting faces for leading said material into said guide means.

4. Threading apparatus for forming a knot of predetermined configuration comprising a first pair of dies, each die of said first pair of dies having a confronting face, a second pair of dies, each die of said second pair of dies having a confronting face, the confronting faces of said first pair of dies being disposed at right angles to the confronting faces of said second pair of dies, means to position a multi-apertured member between said pairs of dies, guideways disposed in said confronting faces of said dies, said guideways forming a continuous path for movement of an elongated flexible member through the apertures in said multi-apertured member.

5. Threading apparatus as set forth in claim 4 wherein said guideways have portions terminating adjacent to and aligned with the apertures in said multi-apertured member.

6. Threading apparatus as set forth in claim 4 further comprising two openings in said dies for permitting entrance of an elongated member into said guideways and two openings for permitting exit of said elongated member from said guideways.

7. Threading apparatus as set forth in claim 4 further comprising means for moving said confronting die faces toward and away from each other.

8. Threading apparatus as set forth in claim 4 further comprising separator means disposed between at least one of said pairs of cooperating dies, said separator means functioning to assist in maintaining an elongated member in said guideways.

9. Threading apparatus as set forth in claim 8 wherein said separator means is a relatively thin elongated blade and wherein said confronting faces have relieved portions for receiving said blade.

10. Threading apparatus as set forth in claim 4 further comprising means for aligning said first pair of dies with said second pair of dies to insure proper orientation between said guideways.

11. Apparatus for assembling a multi-apertured member and a length of filamentary material comprising a threading station, strip feeding means for feeding multi-apertured members in strip form to said threading station, positioning means for positioning one of said members at said threading station, material feeding means for feeding said filamentary material to said threading station, first die means located between said one member and said material feeding means, second die means located on an opposite side of said one member from said first die means, and guide means disposed in said first and second die mean for guiding said material through the apertures in said one member, said guide means being aligned with said material feeding means and with the apertures in said one member.

12. Assembling apparatus as set forth in claim 11 further comprising severing means for severing said one member from said strip subsequent to guiding said filamentary material through said member.

13. Assembling apparatus as set forth in claim 11 further comprising severing means for severing said filamentary material into discrete lengths.

14. Assembling apparatus as set forth in claim 13 wherein said material feeding means is reversible to thereby feed material in opposite directions.

15. Assembling apparatus as set forth in claim 14 wherein said material feeding means is rotatable approximately 180 degrees to enable feeding of both ends of said filamentary material.

16. Assembling apparatus as set forth in claim 11 further comprising gripper means for pulling said filamentary material through the apertures in said member to thereby tighten the assembly.

17. Assembling apparatus as set forth in claim 11 further comprising means for locating said first and second die means in assembling position, and means for moving said first and second die means in and out of said assembling position.

18. Assembling apparatus as set forth in claim 11 wherein said first die means comprises a pair of cooperating dies having confronting faces and wherein said second die means comprises a pair of cooperating dies having confronting faces.

19. Assembling apparatus as set forth in claim 18 wherein said guide means is disposed in the confronting faces of said first and second die means.

20. Assembling apparatus as set forth in claim 19 further comprising separator means movable between said confronting faces and cooperable with said guide means for leading said filamentary material through the aperture in said member.

References Cited

UNITED STATES PATENTS

| | | | |
|---|---|---|---|
| 2,691,817 | 10/1954 | Rainone et al. | 29—241 X |
| 2,978,800 | 4/1961 | Blain | 29—203 |
| 3,445,912 | 5/1969 | Perlman | 29—208 X |

THOMAS H. EAGER, Primary Examiner

U.S. Cl. X.R.

29—241